United States Patent
Wendt

[19]

[11] Patent Number: 5,990,917
[45] Date of Patent: Nov. 23, 1999

[54] METHOD AND APPARATUS FOR PRODUCING A PRINTING IMAGE DISTRIBUTION

[75] Inventor: Karsten Wendt, Obertshausen, Germany

[73] Assignee: MAN Roland Druckmaschinen AG, Germany

[21] Appl. No.: 08/994,235

[22] Filed: Dec. 19, 1997

[30] Foreign Application Priority Data

Dec. 21, 1996 [DE] Germany .......................... 196 54 018

[51] Int. Cl.$^6$ ....................................................... B41J 2/38
[52] U.S. Cl. ............................................................ 347/187
[58] Field of Search .................................... 347/185, 187; 400/120.08

[56] References Cited

FOREIGN PATENT DOCUMENTS 39 17 844 10/1990 Germany .

OTHER PUBLICATIONS

Patents Abstracts of Japan—M–1016 Aug. 27, 1990 vol. 14/No. 395—JP–15 03 51 (A) Abstract.

*Primary Examiner*—Huan Tran
*Attorney, Agent, or Firm*—Leydig, Voit & Mayer, Ltd.

[57] ABSTRACT

A method and apparatus is disclosed for setting a distribution of image points on a printing surface having a coating of thermally activated material. For each image point to be set and used as part of an image, a laser heats the image point for a predetermined time period to a limiting or process temperature. The image points are preheated to an intermediate temperature below the limiting or process temperature and above an ambient temperature in order to reduce the energy required to raise the temperature of the thermally activated material at an image point to be set. In one embodiment of the invention, the entire printing surface is preheated to the intermediate temperature. In an alternative embodiment of the invention, only a region of the printing surface is preheated. In this alternative embodiment, the region moves with a writing head that sets the image points. In this regard, the rate of travel of the image head across the printing surface is such that a temporal stationary temperature is reached at the intermediate temperature prior to raising the temperature to the limiting or process temperature.

18 Claims, 6 Drawing Sheets

METHOD AND APPARATUS FOR PRODUCING A PRINTING IMAGE DISTRIBUTION

TECHNICAL FIELD

The invention relates to a method for producing an image on a printing plate and, more particularly, to producing such an image in a layer of the plate comprising thermally activatable material.

BACKGROUND OF THE INVENTION

During the production of printing forms, the printing and non-printing surface parts must be structured in accordance with the information to be printed. Thus, it is known to convert thermally changeable coating applied to a base material into oleophilic, ink-accepting parts by heating the coating using suitable means such as a laser beam. The thermally changeable coating material has hydrophilic properties.

Printing forms work with a printing unit and can be of several types. For example, the forms can be plates clamped onto a cylinder, which are commonly used for off-set printing. Alternatively, they can be films in a special printing form image printing device or a surface of a machine cylinder. In a flat bed printing method using direct image printing, a laser is commonly used to write onto the printing forms. As a result of the input of heat by means of the laser, a thermally activatable coating on the forms has hydrophilic properties. It is converted or transformed from a hydrophilic state to an oleophilic, ink-accepting state in response to heat generated by application of the laser light to a spot-sized area (hereinafter the "image point").

The temperature applied to an image point on the thermally activatable coating of a form must exceed a specific threshold value. This means that the energy applied to the coating by the laser must locally exceed a threshold value, which in turn generates thermal heat that raises the temperature of the image point above an "image setting temperature." This "image setting temperature" (e.g., 280°) must be exceeded for a predefined period of time such as one to two microseconds. The image point is not set if this temperature versus time characteristic is not observed. This temperature versus time characteristic is predefined and oriented to the chemical and physical properties of the thermally activatable material.

Writing printing forms by means of supplying heat is in this case unable to structure the surface with respect to the information to be printed simply on the basis of a physical and/or chemical change to the coating material. In this context, methods for image printing by means of thermal abrasion are also known in which an image is created based on a point-by-point energy input. Likewise, with a requirement that a limiting temperature be exceeded for a minimum action time, removal of the coating material from the plate occurs, for example, by evaporation or by restructuring of the plate caused by changes to the plate's volume.

In all of the methods described above for using laser radiation as a source of heat energy to print images in a thermally activatable coating material, the material must be heated to exceed a temperature for a predetermined time interval. Depending on the type of the image printing method and on the composition of the thermally activatable coating material, relatively high laser powers must be employed. The lasers are modulated to provide the minimum time period required for heating each image point, which has a negative effect on the maximum achievable speed of writing precisely onto a large-format printing plate. In the case of this thermal image printing method using laser radiation, however, it is not only disadvantageous to need high laser power that has to be modulated, it is also disadvantageous to require a high amount of thermal energy to be applied to the plate. The higher the temperature necessary to set an image in the thermally activatable coating, the greater the temperature difference between each image point and the region of the plate surrounding the point. This large thermal gradient introduces stresses which can, for example, permanently detach the coating and base material or create deformations in at least one of these two layers of materials. It is also possible for a specific type of thermally activatable coating material to have very good thermal writing properties but nevertheless be considered an undesirable image printing material because it requires excessively high temperatures that accentuate the problems of material separation and/or deformation caused by thermal stresses.

SUMMARY AND OBJECTS OF THE INVENTION

The primary aim of the present invention is, therefore, to provide a method and apparatus for producing a distributed printing image on a thermally activated substrate in such a way that the above-mentioned disadvantages are avoided and reliable structuring of the base and coating materials for a printing plate or form are realized.

The invention is based on direct imaging processes and a device for direct imaging using thermal activated/convertible material, i.e. printing plates or printing molds, having a coating that can be altered at an image point by applying thermal energy in a manner described hereinafter.

According to the invention, the thermal gradient around an image point fixed by thermal action is reduced by heating the region around the point to an intermediate temperature below the temperature for fixing or setting the image point. By heating the region surrounding the image point to be set, the reduced thermal gradient mitigates the separation and deformation problems that plague the prior art approaches. Preferably, the invention employs a two-stage heating action on the material to be printed. First, the thermal material of the plate or printing form is preheated to a temperature below the process temperature for setting or fixing an image point. Second, the image is generated on a point-by-point basis by heating the plate using a modulated laser beam in keeping with the required temperature and time profile for setting each of the image points.

The preheating of the region around the image point to be set or fixed can be the entire plate or printing form. In this case, the entire printing plate or printing form is heated and maintained at a temperature below the limiting or process temperature envisioned for the image printing process. This preheating can be performed, for example, by an electric heating device that is constructed as an oven for the plate.

In an alternative approach for practicing the invention, a small region immediately surrounding the image point is heated. This local preheating of the plate or printing form can also be performed by an electrical heating element, using a fan to direct the heat to a localized area surrounding the image point. As an alternative, however, preheating can be accomplished by a dispersed laser beam, which irradiates the plate or printing form in an appropriately sized region around the image point as it is being set. In this approach, the rate a writing head traverses the plate or form is controlled such that the temperature of the region stabilizes before the image point is set.

One advantage of increasing the local temperature around the image point being fixed is that it is not necessary for the entire printing plate or printing form to be brought to a high temperature level, which has a disadvantage of overall thermal expansion of the plate or form. As an alternative to local preheating using a widened laser beam, preheating by a lacuna with a heating element or by an infrared radiation source would also provide suitable localized heating to an intermediate temperature.

Other objects and advantages will become apparent from the following detailed description when taken in conjunction with the drawings, in which:

Figure 1:
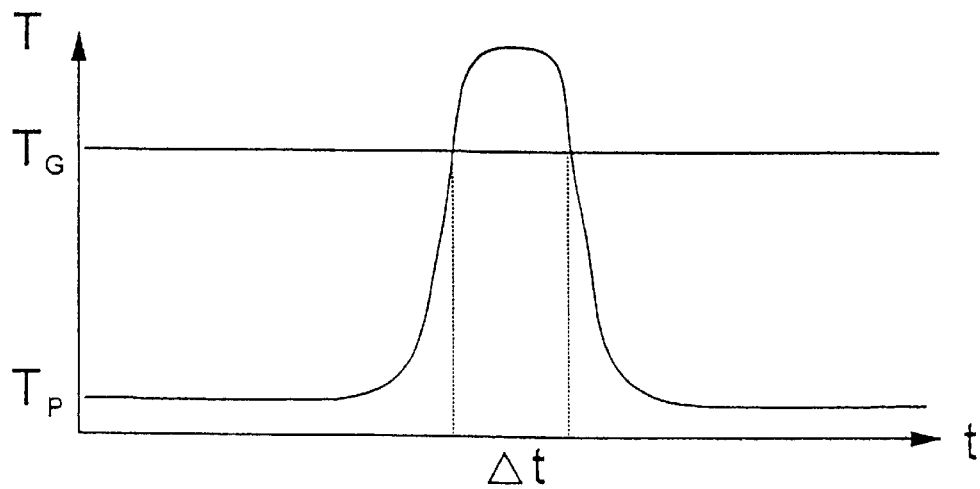
FIG. 1 is a exemplary and idealized temperature profile for heating a plate or printing form material in accordance with conventional practice.

While the invention is susceptible to various modifications and alternative constructions, a certain illustrated embodiment thereof is shown in the drawings and will be described below in detail. It should be understood, however, that there is no intention to limit the invention to the specific form disclosed. To the contrary, the intention is to cover all modifications, alternative constructions and equivalents falling within the spirit and scope of the invention.

DETAILED DESCRIPTION OF THE PREFERRED EMBODIMENT

Figure 6:
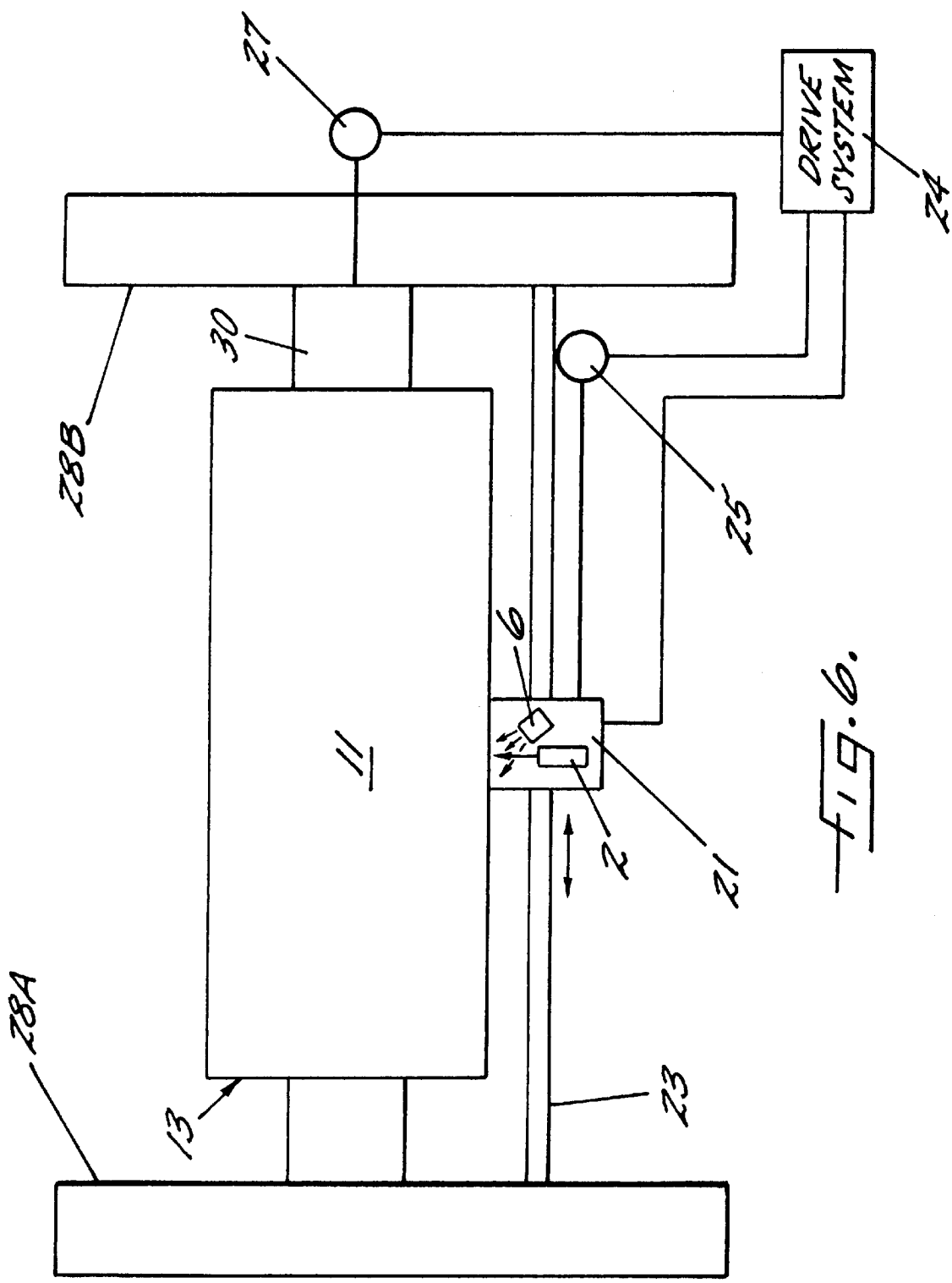
FIG. 6 is a schematic diagram of a system for driving the writing head of FIG. 5, including a rail on which the head is mounted for facilitating the scanning of the head over the surface of the plate or form in conjunction and synchronization with the rotation of the cylinder.

Turning now to the drawings and referring first to FIGS. 1–3, the exemplary temperature versus time profiles for a point (i.e., dot) on the thermally writable surface of a printing plate or form (hereinafter "plate") is set by a modulated laser which scans the plate on a line-by-line basis in a conventional manner as explained more fully hereinafter. In this regard, a writing head transmitting a focused laser beam onto the plate is moved line by line over the plate. In this case, the plate can be clamped on a flat substrate as illustrated in FIG. 4 or it can be written to when it is in place on a cylinder as illustrated in FIG. 6.

The temperature versus time plot in FIG. 1 of the drawings illustrates a conventional temperature profile at the image point to be set or fixed. The image point is the exclusive region of the plate that is subjected to heat. The heat from the laser raises the temperature of the image point from an ambient temperature $T_P$ to the temperature of the limiting or process temperature $T_G$ in accordance with the temperature profile in FIG. 1. Depending on the relative speed of the movement between the writing head and the plate, the thermally activatable material is heated to a temperature above the limiting or process temperature $T_G$ for a time interval $\Delta T$. After the laser beam has moved away from the image point, the temperature of the thermally activatable material drops once more to the ambient temperature $T_P$ as suggested in the terminal portion of the profile in FIG. 1.

The limiting or process temperature $T_G$ is exceeded for a predefined minimum time interval $\Delta T$, wherein both the temperature and time interval depend on the particular composition of the thermal activatable coating material of the plate or form. Only when the temperature $T_G$ is exceeded for the predefined minimum time interval $\Delta T$ does a permanent physical and/or chemical conversion of the thermally activatable plate or form occur. Thus, the speed of the writing head must be controlled accordingly.

Figure 2:
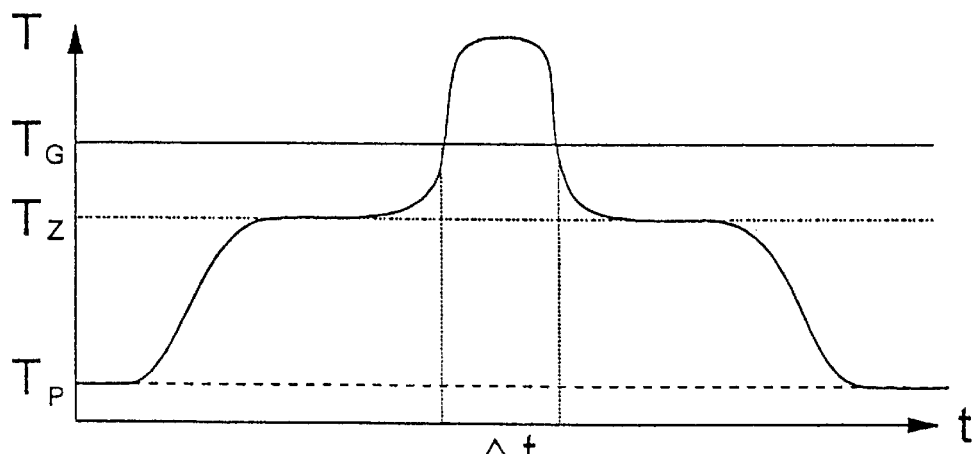
FIG. 2 is an exemplary and idealized temperature profile for heating a plate or printing form material in accordance with one embodiment of the invention, where the entire plate or printing form is preheated to an intermediate temperature $T_Z$.

In accordance with the invention, FIG. 2 illustrates a temperature versus time plot in which the entire plate is preheated by a heating device from the ambient temperature $T_P$ to an intermediate temperature $T_Z$, which is below the limiting or process temperature $T_G$. When the writing head is moved over the surface of the plate, the thermally activatable layer is heated to a temperature above the limiting or process temperature $T_G$ for the predefined time interval $\Delta T$, in substantially the same way as described above in connection with FIG. 1. However, the starting temperature is now the intermediate temperature $T_Z$. Consequently, a lesser amount of heat is required to further raise the temperature of the point to the limiting or process temperature $T_G$. Because less of a temperature rise is necessary to fix or set the image point, a lesser amount of laser power is required to be applied at the plate.

In contrast to the reduced power requirements of the invention as illustrated in FIG. 2, the conventional heating profile in FIG. 1 requires the laser beam to provide sufficient power to the image point so as to raise the temperature an additional amount $T_Z$ minus $T_P$, which often causes deformation or layer separation as described above in the foregoing "Background" section.

Figure 3:
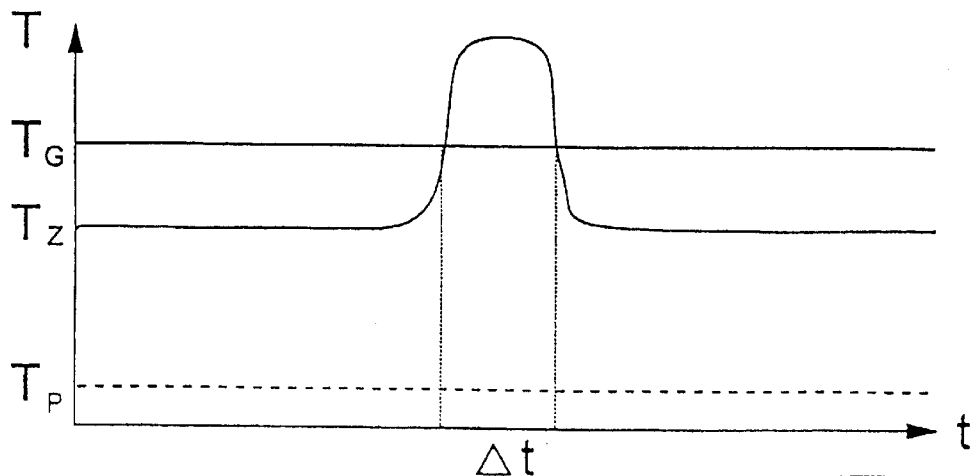
FIG. 3 is an exemplary and idealized temperature profile for heating a plate or printing form material in accordance with an alternative embodiment of the invention, where a local region of the plate or printing form is preheated and the local region moves with the laser beam that sets or fixes the image points.
Figure 4:
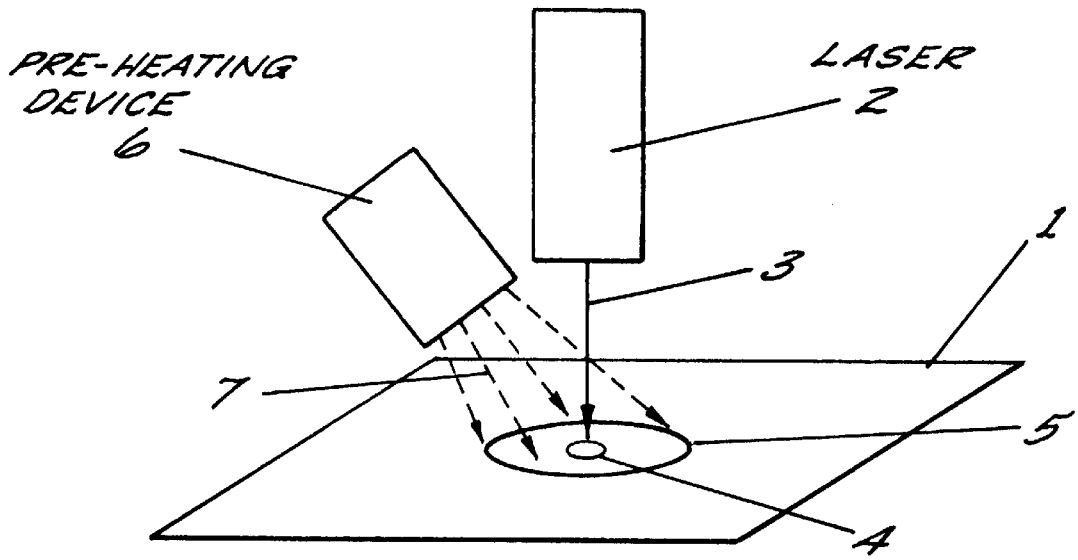
FIG. 4 is a schematic representation of a writing head with a laser and a thermal pre-warming device in accordance with the invention for generating both the thermal set point and the thermal preheating of the surrounding region of a flat plate.

The exemplary temperature profile of FIG. 3 illustrates an alternative embodiment of the invention wherein the image point is preheated only for a time immediately preceding the heating of the point to the limiting or process temperature $T_G$. In this alternative embodiment, the advantages of preheating are realized while preheating only the image point and an area immediately around the image point for a time period related to the time period required to fix or set the point rather than the much longer time period for setting the points for the entire plate.

In this alternative embodiment of the invention, provision is made for the speed of movement of the writing head containing the laser device to be matched to the heating power of the preheating system in such a way that a temperature state results which is steady over time with respect to the intermediate temperature $T_Z$. Then, as in the exemplary embodiment according to FIG. 2, the thermally activatable material of the plate is brought to a temperature above the limiting process temperature $T_G$ according to the envisioned minimum action time $\Delta T$ by means of the modulated laser beam. After the image point has been set, the heat dissipates and the temperature cools to the intermediate temperature $T_Z$. The point will stabilize at the intermediate temperature $T_Z$ until the regional heating of the plate no longer includes the area around the set or fixed point. Thus, the temperature will plateau at the intermediate temperature $T_Z$ until the printing head moves farther away, which results in the region of preheating moving off the set image point and, therefore, the temperature returns to the ambient temperature $T_P$.

As can be seen from the foregoing description, there is provided a method and apparatus for preheating thermally writable printing plates or forms, which enables the amount of laser power applied to set image points to be lessened with respect to the methods of the prior art. By applying a reduced amount of laser power to write onto the plate, the problems of deformation or layer separation are dramatically reduced, which results in higher quality printing plates that in turn provide higher quality prints.

FIG. 4 illustrates a laser 2 focused on an image point 4 of a plate. In keeping with the invention, a preheating device 6 such as an infrared radiator or a hot air blower preheats an area or zone 5 surrounding the image point 4. The laser 2 is of a conventional construction for producing a modulated laser beam 3. The preheating device can be also of conventional design for producing a directed beam of infrared radiation 7 or simply generating an air flow of heated air directed to the region 5.

In FIG. 4, the printing plate is in a planar configuration. In a conventional manner, the laser 2 and preheating device 6 are mounted together in a writing head, which in turn is mounted to a drive system for incrementally moving the writing head to discrete image points on the plates that form an array. By heating selective ones of the image points in the array, the writing head forms an image on the thermally actuatable surface of the plate In a conventional manner, writing head moves incrementally along a rail (not shown) for traversing the plates. A second rail (also not shown) increments the transverse rail from the top to bottom of the plate so that the writing head scans the entire plate and is positionable over each of the available image points on the plate.

Figure 5:
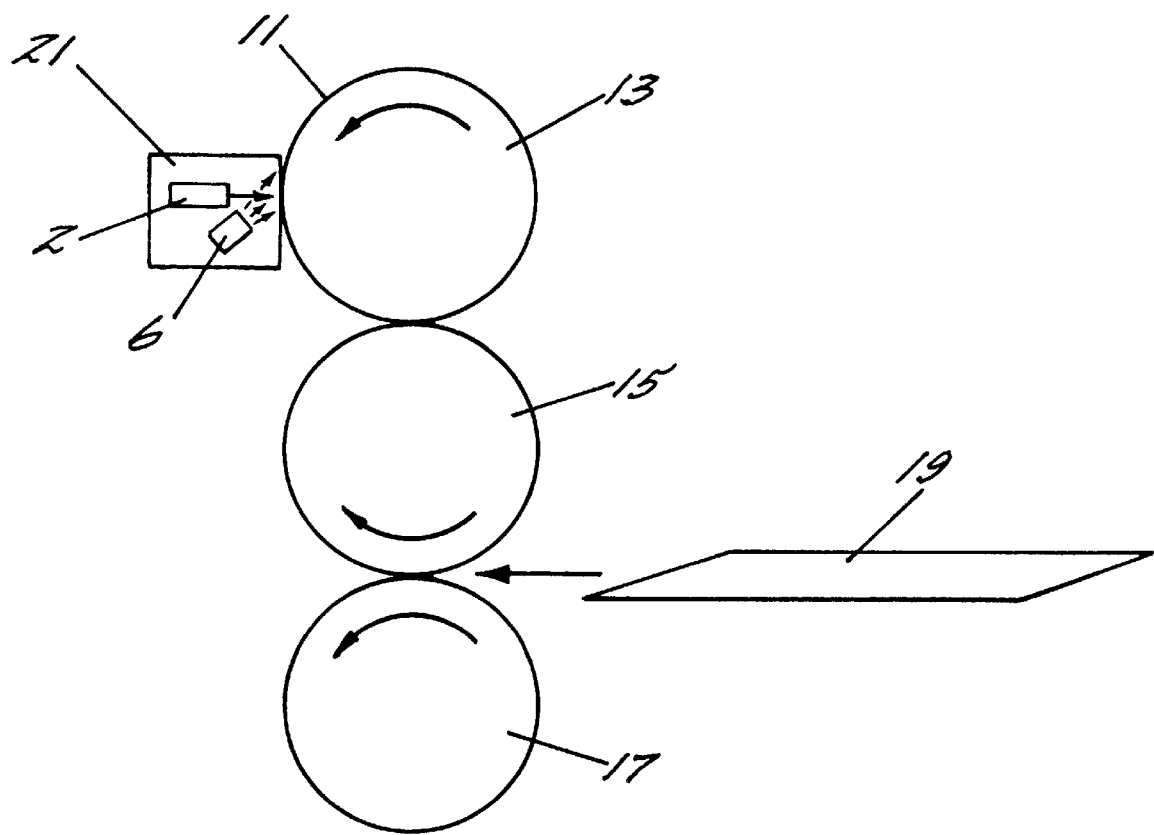
FIG. 5 is a schematic representation of the writing head of FIG. 4 applied to writing to a thermal printing layer on a plate or form mounted to a cylinder.

As an alternative to printing on a flat plate as illustrated in FIG. 4, the invention also contemplates writing in a conventional manner on a plate mounted to a printing cylinder 13 as illustrated in FIG. 5. The three cylinders 13, 15 and 17 illustrated in FIG. 5 are conventional cylinders in a printing unit for off-set printing of a printing sheet 19. In this regard, the printing sheet 19 is directed into a nip formed between a counter-pressure cylinder 17 and a rubber blanket cylinder 15. The image printed onto the printing sheet 19, is impressed onto the rubber blanket cylinder 15 by the plate cylinder 13 in a conventional manner. As illustrated in FIG. 5, the writing head 21 for performing the method of the invention is mounted to an apparatus for coordinating the transverse movement of the writing head 21 along the length of the cylinder 13 and coordinating that movement with the rotational movement of the cylinder.

Figure 7:
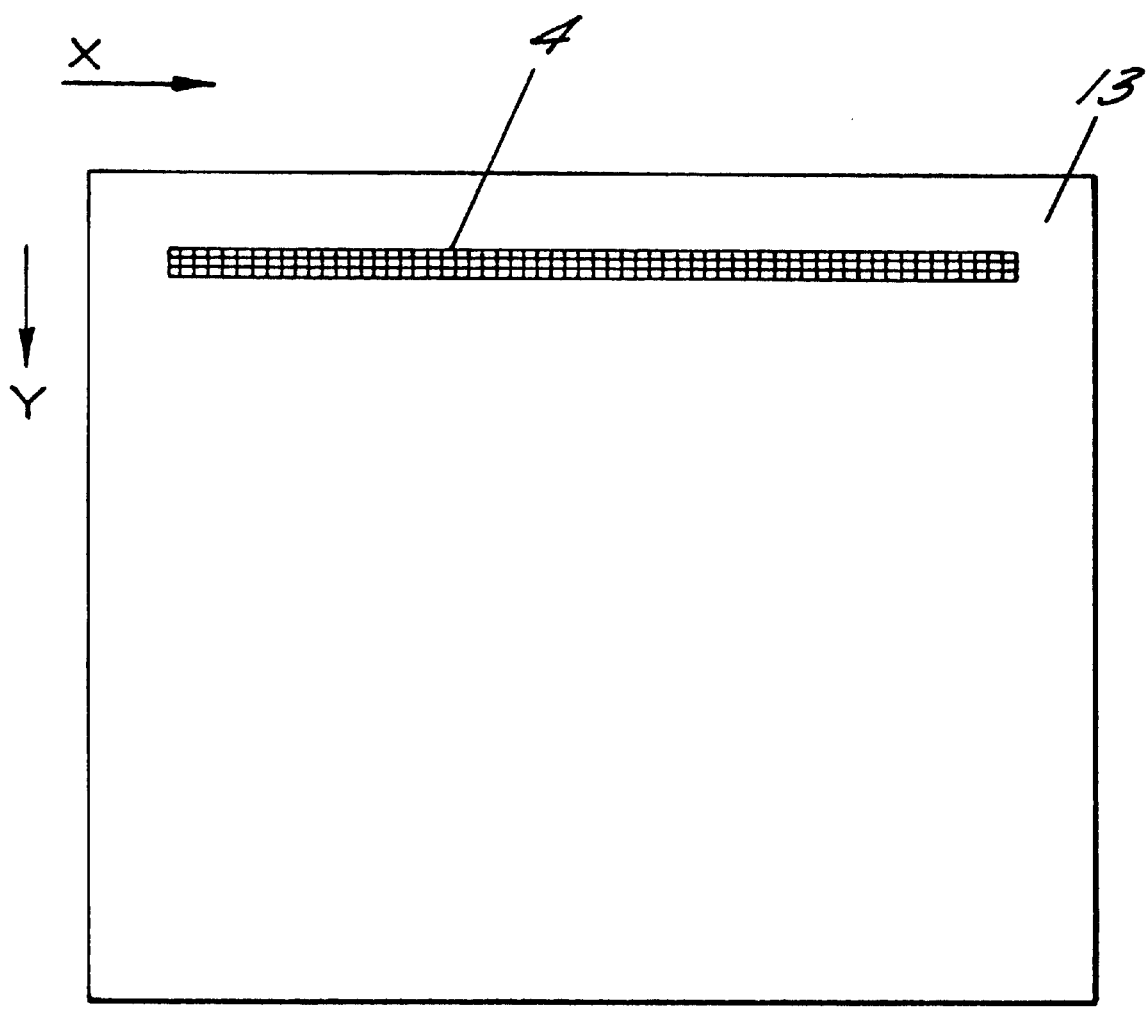
FIG. 7 is a plan view of a thermally writable printing form illustrating the location of an exemplary few lines of image points in a matrix of image point candidates, which matrix is used as a map to locate image points to be set or fixed by the writing head.

The mechanism for controlling the movement of the writing head 21 and coordinating that movement with the rotational movement of the cylinder 13 is illustrated in FIG. 6. The writing head 21 is mounted for reciprocating movement on a rail 23 that maintains the writing head in proper alignment with the thermally writable printing form 11 on the cylinder 13 for setting image points. A system drive 24 controls the reciprocating movement of the writing head 21 on the rail 23 in a manner such that the writing head moves in increments from one end of the cylinder to the other. As suggested by the illustration of the printing form 11 in FIG. 7, the cylinder 13 in FIG. 6 is held static by a rotational drive 25 while the writing head 21 is moved along the rail 23 from one end of the cylinder to the other in order to set selected ones of the image points 4, which create a distribution of the set points that form an image when viewed as a composite. Rotational drive 25 may be a motor such as a stepper motor whose step resolution complements the granularity of the image points as suggested by their spacing in the illustration of FIG. 7. In this regard, one transverse pass of the writing head 21 allows the head to set selected ones of the image points 4, in a line of an array of points as illustrated in FIG. 7.

In order to increment the writing head 21 to the next line, a drive 27 for the cylinder 13 in FIG. 6 rotates the cylinder by an incremental amount that rotates the thermally writable printing form 11 mounted to the cylinder by an amount that aligns an adjacent line of image points with the writing head. Like the drive 25, the drive 27 may be a motor such as a stepper motor whose step resolution complements the granularity of the lines as suggested by the spacing of the lines in the illustration of FIG. 7. The cylinder 13 is mounted for rotation on support structures 28A and 28B. The cylinder 13 is mounted for rotation on a shaft 30, which is driven by the drive 27.

In a conventional manner, the drive system 24 for the drives 25 and 27 coordinates the rotational movement of the cylinder 13 and the reciprocating movement of the writing head 21 on the rail 23. Also, the drive system provides control signal to the laser 2, causing it to modulate its laser beam so as to set only those image points 4 desired to create the overall image to be printed on the printing sheet 19. The hardware of the drive system 24 is shown in FIG. 8 and the methodology executed by the hardware for scanning the printing form 11 in a line-by-line basis is illustrated in a flow diagram in FIG. 9.

Figure 8:
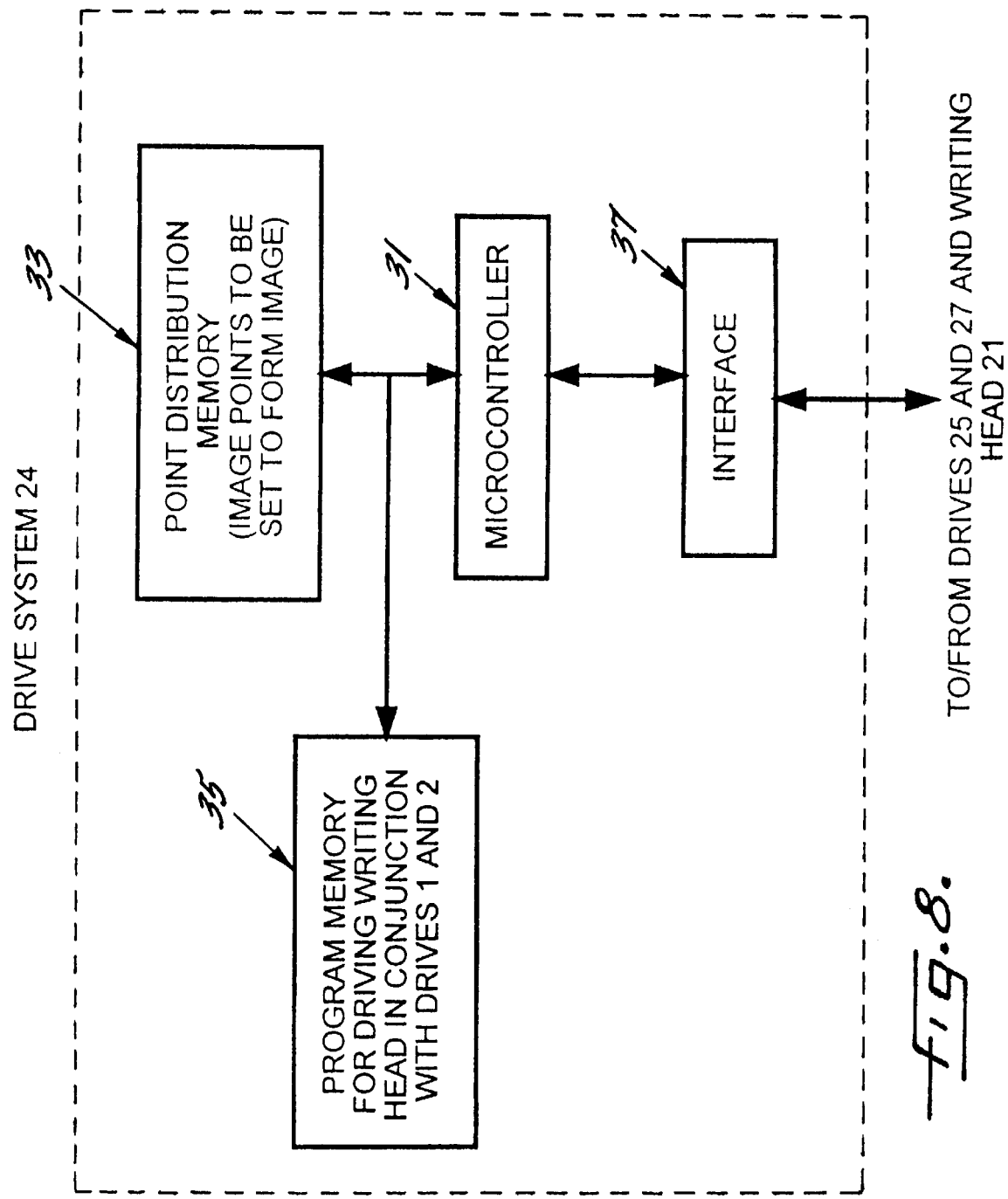
FIG. 8 is a block diagram of a controller for the drive system and laser of the writing head as illustrated in FIG. 6.

The drive system 24 includes a microcontroller 31 as illustrated in FIG. 8, which is in communications with a memory 33 that contains a file of the image. The image file is formatted to complements the physical matrix format of the image points 4 placed on the form 11. In this regard, the file of the image can be a simple matrix itself with each cell corresponding to one of the image points. Each cell can include a data field that is interpreted by the micro controller for the purpose of providing an appropriate control signal for modulating the laser to set selected ones of the points. The microcontroller 31 also is in communications with a program memory 35, which contains executable files for controlling the movement of the drives 25 and 27 and the laser 2 In a conventional manner, an interface 37 communicates control signals from the microcontroller 31 to the drives 25 and 27 and the laser 2.

Figure 9:
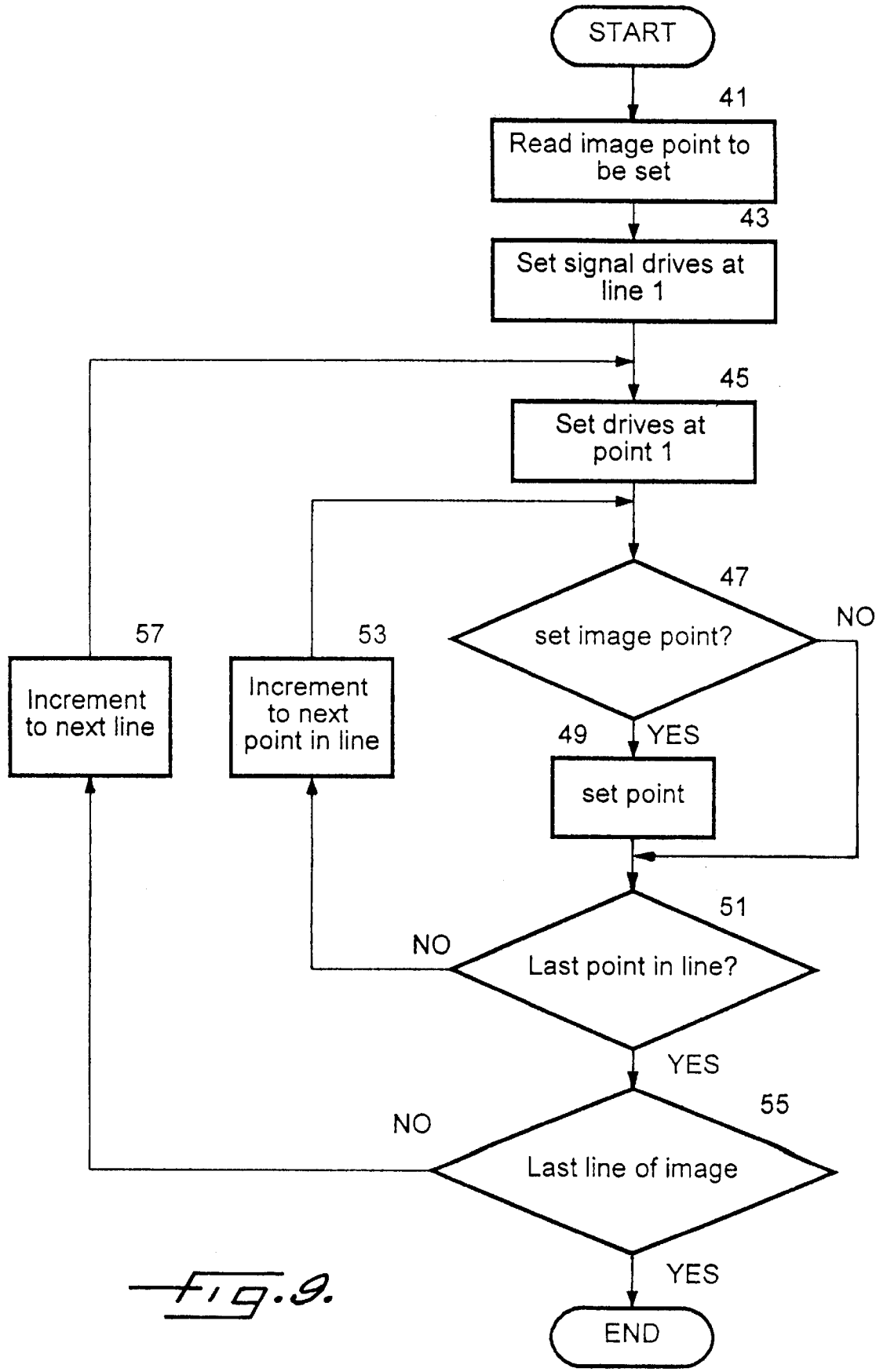
FIG. 9 is a high level flow diagram of the steps executed by the drive system in order to write the image points in precise locations on the thermal layer by following the matrix map of FIG. 7.

Turning to the flow diagram of FIG. 9, the drive system 24 scans the image points 4 in a recursive manner, beginning with a first point in the matrix of image points (see FIG. 7) to the last point in the matrix. Starting at step 41, the microcontroller 31 reads the image points to be set from the point distribution memory 33. Pursuant to the program memory 35, the microcontroller 31 executes the remaining steps in the flow diagram of FIG. 9 in a recursive manner.

Specifically, the microcontroller 31 sets the drives 25 and 27 such that the writing head 21 is initially aligned with the first line and first point in that line at steps 43 and 45, respectively. Pursuant to the program in memory 35, the first line is thereafter scanned on a point-by-point basis in steps 47, 49, 51 and 53 until the last point in the line is identified in step 51. When the last image point 4 is identified in the line at step 51, the program 35 controlling the microcontroller 31 branches to step 55 to determine whether a next line exists. If the line just scanned is the last line, the program 35 exits and releases control of the microcontroller to other operations. Otherwise, the program 35 increments to the next line by driving the driver 27 by an incremental amount at step 57. The program 35 then returns to step 45 as illustrated in the flow diagram of FIG. 9 and repeats the steps for 45, 47, 49, 51 and 53 in a recursive manner. After all of the lines have been scanned and selected ones of the image points 4 have been set in keeping with the data in the point distribution memory 33, the desired image is then completely written to the form 11, which is now ready for use in an off-set printing process as illustrated in FIG. 5.

What is claimed is:

1. A method for setting a distribution of image points on a printing surface having a coating of a thermally activated material comprising:

moving an imaging device across the printing surface for the purpose of setting an image point generated by locally warming the thermally activated material for a predetermined time period to a limiting temperature that is determined by thermal characteristics of the thermally activated material;

preheating the thermally activated material in an area surrounding at least the image point to be set to an intermediate temperature below the limiting temperature of the thermally activated material; and locally heating the thermally activated material starting with the intermediate temperature while the imaging device moves across the printing surface at a speed such that a temporal stationary temperature is reached with respect to the intermediate temperature prior to raising the temperature to the limiting temperature.

2. The method of claim 1 wherein the printing surface is heated, in a region around the image point to be set, to the intermediate temperature above the plate temperature and below the limiting temperature, the size of this region situated around the image point to be set being a multiple of the size of said image point.

3. The method of claim 1 wherein the entire area of the thermally activatable material of the printing plate is heated to an intermediate temperature above the plate temperature and below the limiting temperature of the activatable material.

4. The method of claim 1 wherein the incremental heating of the thermally activatable material of the printing plate is performed by means of laser radiation, the radiation power of the laser being matched to the heating of the thermally activatable material of the printing surface from the intermediate temperature to a prefined value above the limiting temperature of the thermally activatable material.

5. The method of claim 1 wherein the preheating of the thermally activatable material of the printing surface to an intermediate temperature above an ambient temperature and below the limiting temperature necessitated by the material is performed by electromagnetic radiation.

6. The method of claim 5 wherein the heating of the thermally activatable material is performed by infrared radiation.

7. The method of claim 5 wherein the heating of the thermally activatable material is performed by laser radiation.

8. The method of claim 5 wherein the heating of the thermally activatable material to an intermediate temperature below the limiting temperature of the material is performed by a hot-gas stream directed onto the material layer.

9. The method of claim 5 wherein the heating of the thermally activatable material to an intermediate temperature below the limiting temperature of the material is performed by heating a body that is in thermal contact with the thermally activatable material.

10. A device for generating a print image distribution on a printing plate having a printing surface comprised of a thermally activatable material, the device comprising:

an imaging arrangement that is movable relative to the surface of the printing plate for forming image points on the thermally activatable material of the printing plate by warming the thermally activatable material to a temperature corresponding to the limiting temperature; and a heating arrangement associated with the imaging arrangement for warming the printing plate in a zone around the image points to be formed to an intermediate temperature below the limiting temperature of the thermally activatable material;

wherein the travelling speed of the imaging arrangement is attuned to the heating performance of the heating arrangement in such a manner that there is yielded a laterally stationary temperature state with respect to the intermediate temperature to be achieved.

11. The device of claim 10 wherein the printing plate is warmed in a region around the image point to be set to an intermediate temperature above the plate temperature and below the limiting temperature where the size of the region situated around the image point to be set is a multiple of the size of said image point.

12. The device of claim 10 wherein the entire area of the thermally activatable material of the printing plate is warmed to an intermediate temperature above the plate temperature and below the limiting temperature of the thermally activatable material.

13. The device of claim 10 wherein the imaging arrangement further comprises a laser designed for warming the thermally activatable material of the printing plate from the intermediate temperature to the limiting temperature of the thermally activatable material.

14. The device of claim 10 wherein the heating arrangement further comprises a source of electromagnetic radiation.

15. The device of claim 10 wherein the heating arrangement further comprises a source of infrared radiation.

16. The device of claim 10 wherein the heating arrangement further comprises a source of laser radiation.

17. The device of claim 10 wherein the heating arrangement further comprises a source of hot-gas.

18. The device of claim 10 wherein the heating arrangement is in thermal contact with the thermally activatable material.

\* \* \* \* \*